United States Patent [19]
Smith et al.

[11] 4,221,472

[45] Sep. 9, 1980

[54] NONLINEAR OPTICAL FABRY-PEROT RESONATOR

[75] Inventors: Peter W. Smith, Colts Neck; Edward H. Turner, Rumson, both of N.J.

[73] Assignee: Bell Telephone Laboratories, Incorporated, Murray Hill, N.Y.

[21] Appl. No.: 937,186

[22] Filed: Aug. 28, 1978

[51] Int. Cl.³ .............................................. G02F 1/03
[52] U.S. Cl. .............................. 350/356; 331/94.5 S; 356/352
[58] Field of Search .................... 331/94.5 C, 94.5 M, 331/94.5 S; 356/352; 350/355, 356

[56] References Cited

U.S. PATENT DOCUMENTS 3,243,722   3/1966   Billings ........................... 331/94.5 S

FOREIGN PATENT DOCUMENTS 381054   8/1973   U.S.S.R. .................................. 356/112

OTHER PUBLICATIONS

Smith et al., Nonlinear Electro-Optic Fabry-Perot Devices Using Reflected Light Feedback, Optics Letters vol. 2, No. 3 (Mar. 1978), pp. 55–57.
Smith et al., Electro-Optic Nonlinear Fabry-Perot ... ectr. vol. QE-14, No. 3
Smith et al., ... ry-Perot Resonator, Applied Phys. Lett. vol. 30, No. 6 (Mar. 15, 1977), pp. 280–281.

*Primary Examiner*—William L. Sikes
*Attorney, Agent, or Firm*—Daniel D. Dubosky

[57] ABSTRACT

An optical apparatus which provides a nonlinear characteristic between input and output amplitude levels is disclosed. A single frequency linearly polarized single mode light beam having amplitude variations that are to be acted upon is coupled to a Fabry-Perot interferometer (10) having two mirrored ends (11 and 12) and substantially filled with an electrooptic material (13) having electrodes (14 and 15). A beam splitter (21) is positioned and oriented so as to deflect optical energy that is reflected from the cavity into a photodetector circuit (22 and 23) whose output voltage is applied to the electrodes of the electrooptic material. Adjustment of the cavity length provides a wide range of nonlinear characteristics including some that permit the apparatus to be used as a bistable memory element and others which permit the device to be used as a clipper for all input power levels below a predetermined threshold level.

5 Claims, 6 Drawing Figures

NONLINEAR OPTICAL APPARATUS USING FABRY-PEROT RESONATORS

BACKGROUND OF THE INVENTION

This invention relates to nonlinear optical apparatus of the type that provides limiting and clipping characteristics and more particularly, to such apparatus that uses Fabry-Perot resonators as the central element.

In the copending application entitled "Interferometer Apparatus Using Electrooptic Material with Feedback", by P. W. Smith, Ser. No. 902,733, filed May 3, 1978 an optical apparatus is disclosed that is capable of providing a large number of nonlinear functions to an input optical signal. The apparatus disclosed can not only function as a bistable memory element, but can also function to provide the well known limiter characteristic.

In this prior art apparatus a single frequency linearly polarized single mode light beam is coupled to one end of a Fabry-Perot resonator. The resonator is substantially filled with an electrooptic material such as lithium niobate having electrodes to which a voltage is applied. A photodetector is positioned so as to be responsive to the optical energy transmitted by the resonator, and this photodetector develops a voltage which is applied to the electrodes of the electrooptic material. By adjusting the resonator so as to provide a predetermined phase shift with zero voltage on the electrodes, the well known limiter charateristic can be provided to limit the amplitude variations that occur in the input optical energy.

Another characteristic that is useful in transmission systems is a clipper characteristic, that is, one which provides substantial loss to low level input signals and which provides little loss or essentially unity gain to signals that exceed a predetermined threshold. By using apparatus that provides a clipper characteristic, an information signal can be separated from a low level extraneous noise signal that may have been introduced in transmitting the information signal over a transmission medium. The apparatus disclosed in the above-identified Smith application cannot provide this highly desirable clipper characteristic.

SUMMARY OF THE INVENTION

A clipping characteristic and an even more precise limiter characteristic can be provided by apparatus constructed in accordance with the present invention wherein a single frequency linearly polarized single mode light beam having amplitude variations that contain desired information is coupled to one end of a Fabry-Perot resonator. As in the prior art apparatus, this resonator is substantially filled with an electrooptic medium having electrodes to which a voltage can be applied. In accordance with the present invention, however, this voltage is developed in response to the intensity of the optical energy that is reflected from the input end of the resonator. By adjusting the resonator to provide a predetermined phase shift with zero voltage on the electrodes of the electrooptic medium, the amplitude of the power at the output end of the resonator is related to the power that is incident on the input end of the resonator by the well known clipping characteristic. Very low levels of incident power are substantially attenuated by the apparatus whereas powers above a predetermined threshold are transmitted in the output with virtually no loss.

For the same adjustment of the resonator that provides a clipping characteristic, the amplitude of the power reflected from the input of the resonator is related to the amplitude of the power incident on the resonator by the well known limiter characteristic. For this adjustment of the resonator low level amplitudes are reflected from the resonator with substantially zero loss whereas amplitudes of the incident power that exceed a predetermined threshold appear as a constant amplitude in the reflected power.

It is a feature of the present invention that very precise optical limiting and clipping charcteristics can be obtained. In the prior art apparatus the type of limiting characteristic that can be obtained is independent on the losses that are present in the resonator mirrors. Due to these losses there is no phase shift of the resonator which will provide a transmission of 100 percent of the power that is incident on the input end of the resonator. In the present invention, however, careful selection of the transmittance and reflectivity of the input and output mirror of the resonator can provide essentially zero power reflected from the resonator for a predetermined phase shift of the resonator. As a result, a very precise control over the limiting and clipping characteristic is obtained.

BRIEF DESCRIPTION OF THE DRAWINGS

The invention will be more readily understood after reading the following detailed description in conjunction with the drawings wherein.

DETAILED DESCRIPTION

Figure 1:
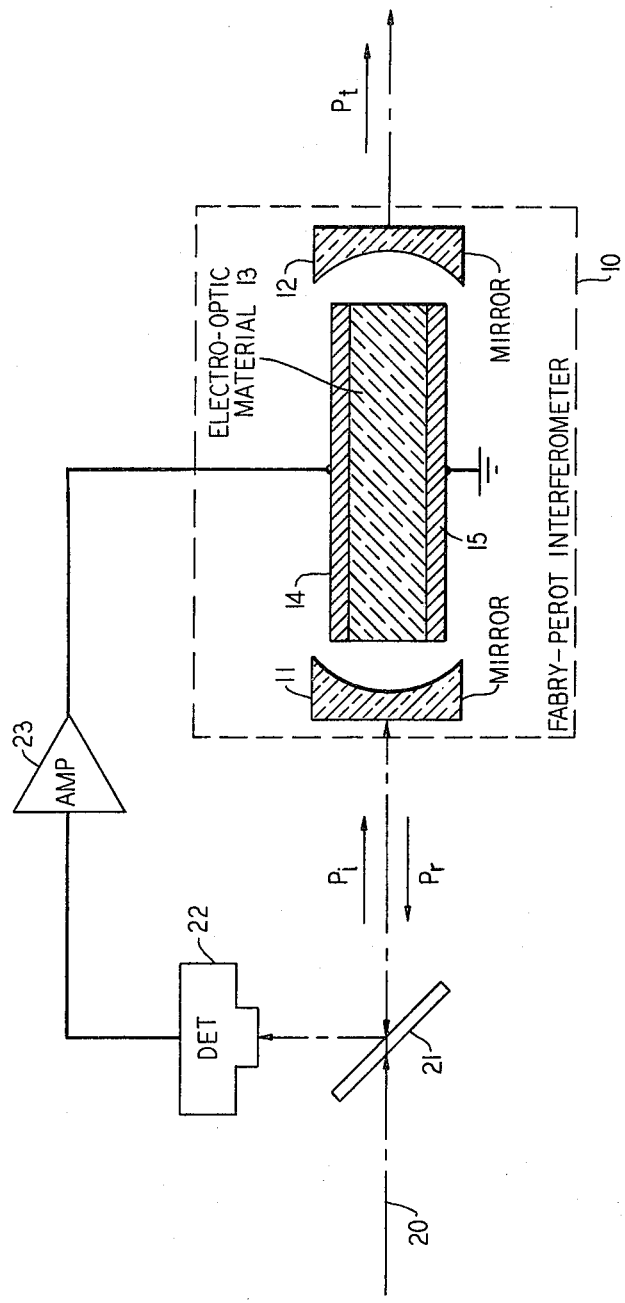
FIG. 1 is a schematic block diagram of the apparatus constructed in accordance with the present invention.

The reflectivity $\rho$ for a lossless Fabry-Perot resonator with two mirrors of reflectivity R and transmissivity T can be expressed by the following equation:

$$\rho = \frac{P_r}{P_i} = \frac{4R \sin^2\phi}{T^2 + 4R \sin^2\phi} \quad (1)$$

Where $P_i$ is the incident single frequency light power, $P_r$ is the light power reflected by the resonator, and $\phi$ is the single pass phase shift in the resonator. In the apparatus shown in FIG. 1 the Fabry-Perot resonator consisting of mirrors 11 and 12 is substantially filled with an electrooptic material 13 onto which electrodes 14 and 15 have been deposited. A single frequency linearly polarized single mode of input optical energy is provided on beam 20. This energy is coupled through a beam splitter 21 to the input mirror 11 of the resonator 10. Optical energy $P_r$ that is reflected by the resonator is deflected by beam splitter 21 to the input of a photodetector 22 whose output voltage is amplified by amplifier 23 and applied to electrodes 14 and 15 of the electrooptic material 13. In this apparatus the single pass shift $\phi$ can be expressed in terms of the following equation:

$$\phi = 2\pi n l/\lambda + CP_r \quad (2)$$

where $n_1$ is the optical length of the resonator with no voltage applied to the electrooptic crystal, $\lambda$ is the wavelength of the incident light, and C is a constant that depends on the detector amplifier and electrooptic modulator characteristics. Equation 2 can be rearranged and the resonator reflectivity $\rho$ can be expressed in terms of the phase shift and constant C by the following equation:

$$\rho = \frac{P_r}{P_i} = \frac{\phi - 2\pi n_1/\lambda}{CP_i} = \frac{\theta}{CP_i} \quad (3)$$

The steady state condition developed in the apparatus of FIG. 1 can be determined by finding simultaneous solutions of Equations 1 and 3. These equations can also be solved graphically.

Figure 2:
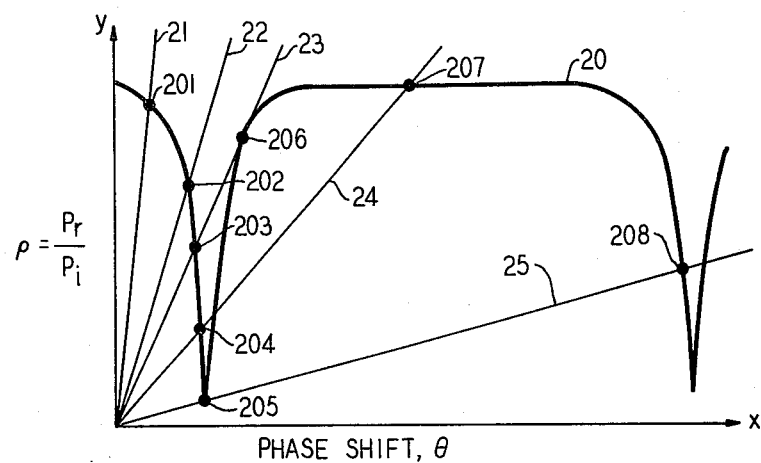
FIGS. 2 through 6 are curves that are useful in describing the operation and adjustment of the apparatus shown in FIG. 1.

In FIG. 2 curve 20 represents the relationship between resonator reflectivity $\rho$ and phase shift $\theta$ for a real Fabry-Perot resonator having some losses in the mirrors. The phase shift $\theta$ is the increase in phase shift created by the application of a potential to electrodes 14 and 15 over and above the phase shift present with zero voltage on the electrodes. This curve 20 in FIG. 2 can, of course, be shifted relative along the x-axis by changing the physical spacing between mirrors 11 and 12. Curves 21 through 25 in FIG. 2 represent relationships defined by Equation 3 for different values of input power $P_i$. As indicated in FIG. 2, the reflectivity in Equation (3) is linearly dependent on the phase shift $\theta$ and can be represented by a line whose slope is inversely proportional to the product of C and $P_i$. Hence, in FIG. 2 curve 21 represents equation (3) with an incident power $P_i$ that is smaller than the incident power for curve 22. The intersection of curves 21 through 25 with curve 20 provide a solution of the simultaneous equations that represents the operating points of the apparatus in FIG. 1. Curves 21 through 25 can be thought of as sweeping through an ever decreasing angle with respect to the x axis in FIG. 2 as the incident power increases.

Figure 3:
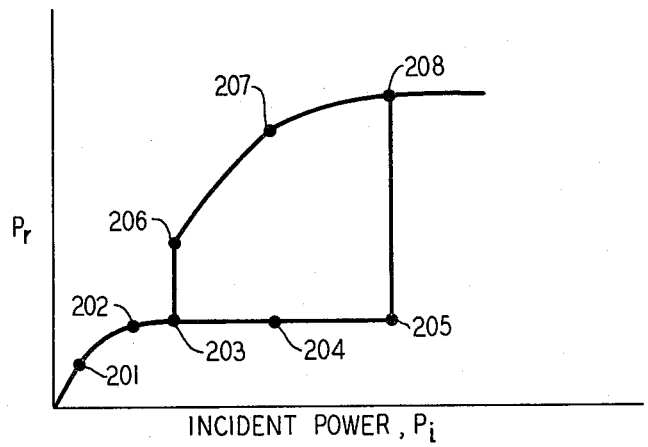

The type of relationship between reflected power $P_r$ and incident power $P_i$ that develops in the apparatus of FIG. 1 for the cavity adjustment illustrated in FIG. 2 is shown in FIG. 3 of the drawings. As indicated in FIG. 3 the reflected power increases up to an operating point represented by the numeral 203 in FIGS. 2 and 3 and remains relatively constant up to the operating point designated by 205. Although the incident power is increasing between points 203 and 205, the reflectivity is decreasing sufficiently fast to prevent any substantial increase in the reflected power. Any further increase in incident power beyond point 205 causes the apparatus to jump to a higher reflectivity represented by point 208 thereby rapidly increasing the reflected power. Decreases in the incident power after this jump has occurred causes the apparatus to pass through the operating point 207 down to a reflected power represented by point 206. Any further decrease in incident power causes the apparatus to return to a lower reflectivity represented by point 203. Hence, the apparatus of FIG. 1 can develop a bistable characteristic of the type illustrated in FIG. 3 which is similar to the bistable characteristic developed by the apparatus in the above-identified copending Smith application. By adjusting the resonator cavity to provide this bistable characteristic, the apparatus can, of course, be utilized as a memory element.

In the embodiment constructed mirrors 11 and 12 were 10 centimeter confocal lenses, and a lithium tantalate electrooptic phase modulator was utilized as the electrooptic material 13 with electrodes 14 and 15. Beam 20 was provided by a single frequency helium neon laser at 6328 A which was focused into mirror 11 of the Fabry-Perot interferometer 10. Mirrors 11 and 12 had transmissivities of 20 percent. Because of losses in the resonator, the finesse of the entire system was only about seven. A Glan-Thompson prism and a Faraday rotator were used to isolate the laser from the Fabry-Perot device in order to prevent any stray reflected power from interferring with laser oscillation. A variable attenuator was used to change the level of power incident on the resonator.

Figure 4:
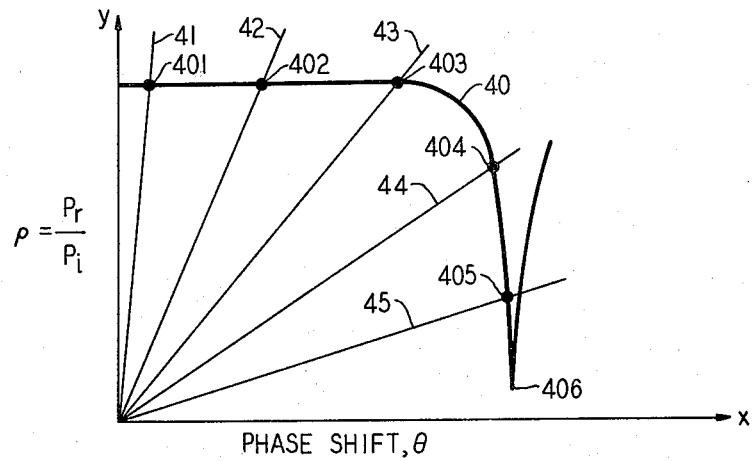

In order to provide a limiter or clipper characteristic, mirrors 11 and 12 are adjusted to a predetermined zero voltage phase shift (i.e., the phase shift of the resonator when $\theta=0$) such that application of increasing voltage to electrodes 14 and 15 will shift the resonator through approximately 65 to 90 percent of the phase shift between resonances before encountering a cavity resonance. This adjustment of the mirrors corresponds to placing the zero voltage phase shift at a point on curve 20 between points 206 and 207. By making this adjustment a curve of reflectivity versus phase shift $\theta$ of the type shown as curve 40 in FIG. 4 is obtained. Curves 41-45 in FIG. 4 are analogous to curves 21 through 25 in FIG. 2 in that they represent plots of Equation 3 for increasing values of incident power $P_i$. The points of intersection 401 through 405 indicate the solution of the two sets of equations and therefore, provide the operating points of the FIG. 1 apparatus when the mirrors are adjusted to provide a limiter or clipper characteristic.

Figure 5:
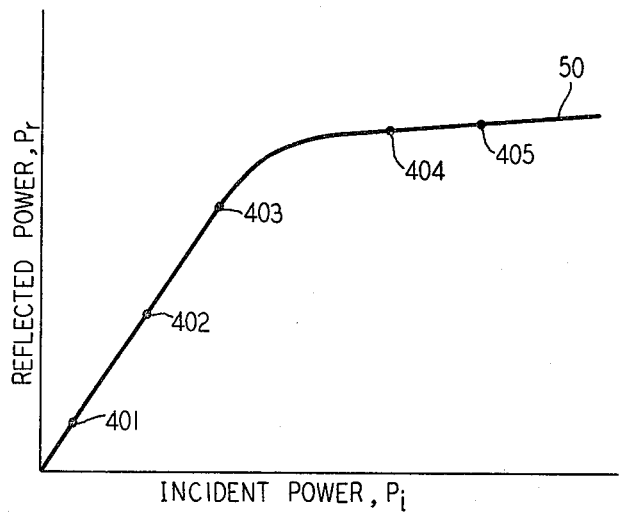

With the mirrors adjusted as indicated in FIG. 4, the reflected power $P_r$ is related to the incident power $P_i$ by a characteristic of the type shown in FIG. 5 by curve 50. It should be apparent to those skilled in the art that curve 50 provides an ideal limiter characteristic. To provide a limiter apparatus, of course, requires that reflected power $P_r$ be utilized as the output power and this, in turn, may require the insertion of an additional beam splitter in the FIG. 1 apparatus. In the case where a Faraday rotator is used to isolate the laser source, it can provide an output beam representing the reflected power. Alternatively, the apparatus may be arranged into a ring cavity having three legs with the electrooptic material in one of the legs of the cavity.

Figure 6:
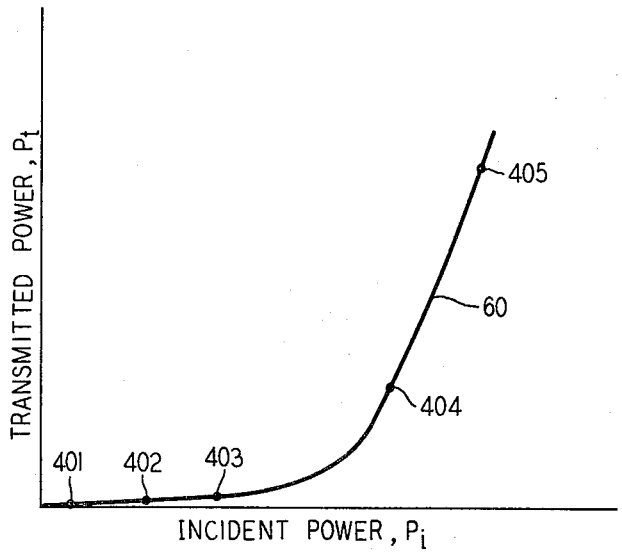

By using the transmitted power $P_t$ as the output power, the apparatus of FIG. 1, when adjusted as indicated in FIG. 4, provides the clipper characteristic illustrated by curve 60 in FIG. 6. Operating points 401, 402 and 403 in curve 60 represent values of incident power that are almost totally reflected by the interferometer 10. Values of incident power in excess of a threshold level between points 403 and 404 are coupled to the output with an approximately linear relationship between the amplitude levels of incident power in excess of the threshold and amplitude levels in the transmitted power $P_t$. Amplitude levels below the threshold are said to be clipped. This type of characteristic is, of course, extremely useful in transmission systems where this clipping characteristic can be utilized to exclude low levels of transmission noise that may have accumulated when the signal is coupled over a long haul transmission system.

The limiter and clipping properties of the apparatus may be improved by depressing the resonance point 406 in curve 40 even further than indicated in FIG. 4. In the prior art apparatus where transmitted power was utilized to develop the voltage for the electrooptic medium, it is not possible to tune the resonator to achieve a transmissivity equal to one due to the losses. In the mirrors in apparatus constructed in accordance with the present invention, howevver, where the reflected power is used to develop voltage for the electrooptic medium, a reflectivity equal to zero is, in general, possible by carefully selecting the reflectivity of the resonator mirrors 11 and 12. If the resonator has a loss per pass of $(1-\alpha)$, the expression for the reflectivity of the resonator becomes $$\rho = \frac{[\alpha\sqrt{R_1R_2}\ (R_1 + T_1) - R_1]^2/R_1 + 4\alpha\sqrt{R_1R_2}\ (R_1 + T_1)\sin^2\phi}{(1 - \alpha\sqrt{R_1R_2}\ )^2 + 4\alpha\sqrt{R_1R_2}\ \sin^2\phi} \quad (4)$$

where $R_1$ and $T_1$ are the reflectivity and transmissivity of input mirror 11, and $R_2$ and $T_2$ are the reflectivity and transmissivity of output mirror 12. As indicated in Equation 4, the reflectivity can be caused to go to zero by selecting the reflectivity and transmissivity of the mirrors such that the following equality is established:

$$\alpha\sqrt{R_1R_2}(R_1+T_1)=R_1 \quad (5)$$

By establishing this equality, the resonance point 406 is caused to go to zero for $\phi=m\pi$ where m is an integer, thereby permitting very high values of incident power to be coupled to the device without causing switching to a higher phase shift characteristic.

Assuming that R+T for each mirror equals 0.98 and $\alpha$ equals 0.98, with $R_2$ equal to 0.96, a reflectivity $\rho$ will equal zero on the resonance for $R_1$ equal to 0.885. If $R_1$ can be selected to within 1 percent, Equations 4 and 5 indicate that optical switching with an on to off ratio greater than 24 dB can be obtained. With different tuning a region can be found where the reflected power will change by only 1.9 percent for a 200 to 1 variation in incident power. Hence, this apparatus can provide a very effective optical power limiter or optical clipper.

What has been described above is merely an illustrative embodiment of the present invention. Numerous departures may be made by those skilled in the art without departing from the spirit and scope of the present invention.

We claim:

1. An amplitude sensitive interferometer device comprising an interferometer cavity (10) having two mirrored ends (11 and 12), one of said two ends being arranged to receive a single frequency lineraly polarized single mode of input optical energy having a changing amplitude and the other of said two ends being arranged to provide output optical energy whose amplitude is related to the amplitude of said input optical energy by a predetermined relationship, an electrooptic medium (13) within said cavity, said electrooptic medium having electrodes (14 and 15) and being positioned within said cavity so as to interact with optical energy present in said cavity, a photodetector means (22 and 23) for coupling a voltage to the electrodes of said electrooptic medium whose magnitude is a function of the intensity of optical energy presented to an input of said photodetector means, characterized in that, a beam splitter means (21) is positioned in the path of said input optical energy to said one of said two ends of said cavity and oriented so as to deflect energy reflected from said one of said two ends into the input of said photodetector means.

2. An interferometer device as defined in claim 1 wherein said two mirrored ends are adjusted to provide a zero voltage phase shift through said cavity of a predetermined value such that increases in voltage applied to said electrodes causes an initial decrease in the reflectivity of said cavity.

3. An interferometer device as defined in claim 1 wherein said two mirrored ends are adjusted to provide a zero voltage phase shift through said cavity of a predetermined value such that increases in voltage across said electrodes initially provides a relatively constant reflectivity from said one end of said cavity.

4. An interferometer device as defined in claim 3 wherein the reflectivity $R_1$ and transmissivity $T_1$ of one of said mirrored ends is related to the reflectivity $R_2$ of the other mirrored end by the following relationship:

$$\alpha\sqrt{R_1R_2}(R_1+T_1)=R_1$$

where $\alpha$ is defined by the fact that $(1-\alpha)$ is the loss for one pass through said cavity.

5. Apparatus for providing a clipping characteristic between an input optical beam and an output optical beam, said apparatus comprisig a Fabry-Perot interferometer cavity (10) having two mirrors (11 and 12) that define two ends of said cavity, one of said two ends being arranged to receive a single frequency linearly polarized single mode of input optical energy having a changing amplitude and the other of said two ends being arranged to provide output optical energy whose amplitude is related to the amplitude of said input optical energy by a predetermined relationship, an electrooptic medium (13) within said cavity oriented such that energy within said cavity interacts with said electrooptic medium, said electrooptic medium having electrodes (14 and 15) to which a voltage can be applied to change the phase shift of said cavity, photodetector means (22 and 23) for coupling a voltage to said electrodes whose magnitude is a function of the intensity of optical energy coupled to an input of said photodetector means, characterized in that, a beam splitter means (21) is positioned in the path of said input optical energy into said one of said two ends of said cavity and oriented such that optical energy reflected from said one of said two ends is coupled to the input of said photodetector means, said two mirrors being adjusted to provide a predetermined phase shift in said cavity when the voltage applied to said electrodes is equal to zero.

* * * * *